Patented Dec. 18, 1923.

1,477,965

UNITED STATES PATENT OFFICE.

EDMUND S. LEAVER, OF TUCSON, ARIZONA, ASSIGNOR OF ONE-THIRD TO CHARLES E. VAN BARNEVELD, OF ST. LOUIS, MISSOURI, AND ONE-THIRD TO LAWRENCE R. ECKMAN, OF TUCSON, ARIZONA.

PROCESS OF MAKING SOLUTIONS CONTAINING SULPHURIC ACID AND FERRIC SULPHATE.

No Drawing.  Application filed March 29, 1922.  Serial No. 547,825.

*To all whom it may concern:*

Be it known that I, EDMUND S. LEAVER, a citizen of United States, residing at Tucson, in the county of Pima, in the State of Arizona, have invented a new and useful Process of Making Solutions Containing Sulphuric Acid and Ferric Sulphate, of which the following is a specification.

This invention relates to the production of solutions containing sulphuric acid, together with ferric salts, such solutions being especially suitable for leaching operations, particularly in the leaching of copper ores. Solutions of this nature may also be utilized for other operations requiring sulphuric acid as a reagent and in which the presence of the iron salts is advantageous or, at least unobjectionable.

I have found that when material containing oxidized iron compounds, for example, calcines produced by roasting pyritic ores, are subjected to the action of gases containing sulphur dioxide, together with a considerable quantity of air and in the presence of water, there is more or less sulphuric acid produced as well as more or less ferric sulphate. The pulp through which the gases containing sulphur dioxide and air are passed will in general contain ferrous sulphate resulting either directly from the operation of a sulphating roast or from the action of more or less sulphuric acid and ferric sulphate already produced on the ferric oxide in the calcines. The action of sulphur dioxide and air in ferrous sulphate in the presence of water causes production of ferric sulphate and sulphuric acid. According to my invention, this reaction is utilized for the production of a solution containing sulphuric acid and ferric sulphate for leaching and other properties.

My invention may be carried out in the following manner: The calcines from a roasting furnace, such calcines having, for example, been subjected to a sulphating roast, are reduced to a suitable state of division and by crushing, grinding or otherwise, water being added during grinding or subsequently to form a pulp. This pulp is then subjected to the action of gases containing air and sulphur dioxide. This may be effected in various ways; for example, 1. By introducing air containing sulphur dioxide through a porous medium into water or pulp containing the ferrous sulphate to effect a fine division of the air passing into the solution, or pulp. The air containing sulphur dioxide may be bubbled through the solution, being admitted by an air jet producing more or less violent agitation of the solution and bubbling of the gas.

2. The air containing sulphur dioxide may be beaten into the solution of pulp by means of mechanical agitators, such as are used in flotation operation.

3. The air containing sulphur dioxide may be brought into contact with the pulp by passing the air in counter-current with the pulp through a rotating drum in a manner substantially as set forth in Patent No. 1,312,488, issued to me August 5, 1919.

The gaseous medium containing air and sulphur dioxide may constitute the effluent of a roasting furnace or it may be generated by means of an ordinary pyrite burner or sulphur burner using sufficient air to give the required dilution of $SO_2$ gas. I have found that in order to effect the described operation, which is essentially an oxidizing operation, it is desirable to provide a sulphur dioxide concentration in the gas of less than one-half of 1 per cent. In any case, the sulphur dioxide content of the gas need not be more than 5 per cent, since with a concentration of that amount the ferric sulphate is completely reduced to ferrous sulphate with substantially complete production of sulphuric acid. The reaction may be regarded as taking place in such manner that the ferrous sulphate is oxidized in the presence of sulphur dioxide and air to form ferric sulphate and the sulphur dioxide then breaks down part or all the ferric sulphate in the presence of water forming ferrous sulphate and sulphuric acid, as shown by the following equations:

(a) 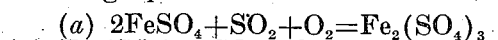
(b) 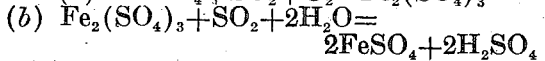

The presence of sulphur dioxide accelerates the oxidation of ferrous iron and the percentage of $SO_2$ present affects the rapidity with which the ferric iron breaks down for the formation of sulphuric acid. When the concentration of the sulphur dioxide in the gas entering or bubbling through the solution containing ferrous iron is less than one-half of one per cent, the formation of ferric iron proceeds more rapidly than the breaking down of the ferric iron to form sulphuric acid. Under these conditions it is practicable to change all of the ferrous iron to ferric iron with the formation of some sulphuric acid. As the percentage of sulphur dioxide in the entering gas increases, more of the ferric iron is broken down so that a concentration of sulphur dioxide can be attained which will effect a complete reduction of all the ferric iron to ferrous iron with production of a corresponding amount of sulphuric acid. By suitably controlling the concentration of the sulphur dioxide in the gas applied to the operation, the proportion of ferric sulphate to sulphuric acid in the final solution may be varied according to the requirements of any particular case. The rapidity of the oxidation is directly proportional to the volume of gas. With 0.5% iron in solution as ferrous sulphate, 10 volumes of 0.5% sulphur dioxide gas per minute to one volume of solution will oxidize all the iron to ferric and at the same time will form nearly 1% sulphuric acid in about two hours. With 1% ferrous iron and other conditions the same, it will require about 4 hours to make 1% ferric iron and 2% sulphuric acid. By arranging apparatus in series it is practicable to utilize 90% of sulphur dioxide. Reaction (A) is retarded in the presence of free sulphuric acid. Maximum oxidation is obtained in neutral solutions.

The solution obtained as above described and containing sulphuric acid together with ferric or ferrous iron or both ferric or ferrous iron in any desired proportion, can be used as a leaching agent, for example, in the recovery of copper from oxidized ores or sulphide ores or mixtures of oxidized or sulphide ores. The lixivium is especially advantageous when applied to mixed oxidized and sulphide ores as the sulphuric acid constituent will serve to dissolve the oxidized ores and the ferric sulphate constituent will serve to dissolve the sulphide ores.

By carrying out the process in the leaching drum or revolving barrel apparatus disclosed in my patent aforesaid, the presence of ferrous sulphate in the solution as it enters the leaching drum produces sulphuric acid at no additional cost and makes the leaching recovery of copper from high siliceous ores practically complete. When iron is used as a precipitant for the Cu, the return solutions furnish the ferrous sulphate at no cost. With the formation of ferric iron within the drum or by an auxiliary method before entering the drum it is in some cases possible to extract both sulphide and nonsulphide copper by leaching in the same operation.

This process of making ferric iron may be applied in making ferric ammonium sulphate and other salts, eliminating the use of nitric acid as an oxidizer and avoiding the subsequent step of its removal, thereby cheapening the manufacture of these salts. For example, into a solution of ferrous sulphate, air containing 0.5% (or less) sulphur dioxide may be passed until complete oxidation results. This will be indicated by change in color of the brownish-red solution to lemon-yellow. If the solution is then evaporated down to the desired specific gravity, the required amount of ammonium sulphate added and the solution allowed to cool, the crystals of ferric ammonium sulphate may be filtered out.

What I claim is:

1. The process of making a solution containing sulphuric acid and ferric sulphate, which consists in subjecting material containing ferrous sulphate in the presence of water to the action of gases containing sulphur dioxide and oxygen.

2. A process as set forth in claim 1, in which the said gases consist mainly of air containing not more than 0.5 per cent of sulphur dioxide.

3. The process which consists in subjecting material containing ferrous sulphate in the presence of water to the action of sulphur dioxide and air to produce ferric sulphate and then acting on the ferric sulphate with sulphur dioxide in the presence of water to form ferrous sulphate and sulphuric acid.

In testimony whereof I have hereunto subscribed my name this 13th day of March, 1922.

EDMUND S. LEAVER.